US012769735B2

(12) United States Patent
Subramaniam et al.

(10) Patent No.: US 12,769,735 B2
(45) Date of Patent: Oct. 20, 2026

(54) ADAPTIVE CACHING OF MODEL RESPONSES

(71) Applicant: Accenture Global Solutions Limited, Dublin (IE)

(72) Inventors: Kamakshi Subramaniam, Rochester, MI (US); Atish Shankar Ray, Herndon, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/819,990

(22) Filed: Aug. 29, 2024

(65) Prior Publication Data

US 2026/0064682 A1 Mar. 5, 2026

(51) Int. Cl.

*G06F 16/27* (2019.01)
*G06F 16/2453* (2019.01)
*G06F 16/2455* (2019.01)

(52) U.S. Cl.

CPC .. *G06F 16/24539* (2019.01); *G06F 16/24552* (2019.01); *G06F 16/27* (2019.01)

(58) Field of Classification Search

CPC ............... G06F 16/24539; G06F 16/27; G06F 16/24552

See application file for complete search history.

(56) References Cited

U.S. PATENT DOCUMENTS 6,587,928 B1 * 7/2003 Periyannan ......... H04L 67/5682 711/131
12,259,913 B1 * 3/2025 Muschett ............ G06F 16/3347
12,261,827 B1 * 3/2025 Xu .......................... H04L 41/16
2006/0015570 A1 * 1/2006 Khemani .............. H04L 63/166 709/217
2009/0094200 A1 * 4/2009 Baeza-Yates ....... G06F 16/9574
2010/0100604 A1 * 4/2010 Fujiwara ............. G06F 12/0866 709/213
2017/0052976 A1 2/2017 Verma et al.
2021/0406735 A1 * 12/2021 Nahamoo ......... G06F 16/24522
2023/0047665 A1 2/2023 Li
2024/0412226 A1 12/2024 Mathur et al.

(Continued)

OTHER PUBLICATIONS

Mohandoss, Ramaswami, "Context-based Semantic Caching for LLM Applications," IEEE Conference on Artificial Intelligence (CAI), 2024, 6 pages. [Retrieved from the interenet: https://ieeecai.org/2024/wp-content/pdfs/540900a361/540900a361.pdf].

(Continued)

*Primary Examiner* — Khanh B Pham
(74) *Attorney, Agent, or Firm* — Mannava & Kang, P.C.

(57) ABSTRACT

Method, system, and computer-readable media for adaptive caching of a response generated by a Large Language Model (LLM) for a received prompt is disclosed. Data associated with the response and the received prompt is processed. A respective value of each of a plurality of features is updated to generate a discrete time series based upon the data. Further, a plurality of caching metrics is generated based upon a plurality of respective values of one or more features of the plurality of features. A safety score corresponding to the plurality of caching metrics is generated. The data based, at least in part, upon the safety score, a response time predicted for a request associated with the received prompt, and metadata, are stored in a caching database.

20 Claims, 6 Drawing Sheets

(56) References Cited

U.S. PATENT DOCUMENTS

| | | | |
|---|---|---|---|
| 2025/0097171 A1 | 3/2025 | Hu et al. |
| 2025/0190763 A1 | 6/2025 | Banuelos et al. |
| 2025/0278578 A1 | 9/2025 | Chawla et al. |
| 2026/0023929 A1 | 1/2026 | Gong et al. |
| 2026/0038035 A1 | 2/2026 | Arora et al. |

OTHER PUBLICATIONS

Javeri, Prashun, "Caching Embeddings using Redis," Medium, Jun. 6, 2024, 7 pages.

Di Feng Bang Fu "GPTCache: An Open-Source Semantic Cache for LLM Applications Enabling Faster Answers and Cost Savings" Dec. 6, 2023, pp. 212-218, XP093327887.

Banghua Zhu et al. "On Optimal Caching and Model Multiplexing for Large Model Inference", Aug. 29, 2023, 34 pages, XP093327973. URL:https://arxiv.org/pdf/2306.02003.

Li Jiaxing Li et al. "SCALM: Towards Semantic Caching for Automated Chat Services with Large Language Models", 2024 IEEE/ACM 32nd International Symposium on Quality of Service (IWQOS), IEEE, XP034709004 arXiv:2406.00025v1 [cs.CL] May 24, 2024 (10 Pages).

Extended Search Report in European Application No. 25195355.0, dated Nov. 7, 2025, 8 pages.

Huang, Yan, and Wei Liu, "Evaluating the Translation Performance of Large Language Models Based on Euas-20," arXiv:2408.03119v1 [cs.CL], Aug. 6, 2024, 15 pages. [https://arxiv.org/pdf/2408.03119].

"Donthi, et al., "Improving LLM Abilities in Idiomatic Translation," arXiv preprint arXiv:2407.03518, 2024, 10 pages. [https://arxiv.org/pdf/2407.0 3518]".

"Stafford, Gary, "Quantitative Evaluation of LLM Responses with RAG-based Question-answering Chatbots," Principal Solutions Architect @AWS/Data Analytics and Generative AI Specialist/Experienced Technology, Aug. 29, 2023, 22 pages.".

Khatun, Aisha and Daniel G. Brown, "TruthEval: A Dataset to Evaluate LLM Truthfulness and Reliability," arXiv:2406.01855v1 [cs.CL], Jun. 4, 2024, 9 pages. [https://arxiv.org/pdf/2406.01855].

Shankar, et al., "Who Validates the Validators? Aligning LLM-Assisted Evaluation of LLM Outputs with Human Preferences," arXiv:2404. 12272v1 [cs.HG], Apr. 18, 2024, 16 pages. [https://arxiv.org/pdf/2404. 12272].

Diandaru, et al., "Could We Have Had Better Multilingual LLMs if English was Not the Central Language?" arXiv:2402.13917v2 [cs.CL] 5 Apr 202, 10 pages.

* cited by examiner

ADAPTIVE CACHING OF MODEL RESPONSES

TECHNICAL FIELD

Various examples described herein relate generally to computer-implemented method, computer system, and computer program product for adaptive caching of responses generated by a Large Language Model (LLM).

BACKGROUND

Generative Artificial Intelligence (Gen AI) refers to advanced AI systems that emulate human cognitive abilities across various applications. These advanced AI systems use sophisticated methods to autonomously process complex data, make decisions, and solve problems. Further, Gen AI encompasses a broad category of AI systems, including specialized subsets like Large Language Models (LLMs) designed for Natural Language Processing (NLP) tasks. The LLMs are trained to understand and generate human-like responses based on input prompts. The LLMs excel in tasks such as language translation, text summarization, sentiment analysis, contextual understanding, and the like.

Beyond their foundational capabilities in NLP, the LLMs also leverage caching mechanisms to enhance efficiency and responsiveness in handling complex tasks. The caching mechanisms in LLMs involves temporarily storing previously computed results to expedite future queries. Therefore, effective implementation of caching is required for the LLMs that hinges on meticulous management of cached data.

SUMMARY

Implementations of the present disclosure are generally directed to dynamically updating caching databases associated with Large Language Models (LLMs). More particularly, implementations of the present disclosure are directed to enabling determination of appropriate metrics for adaptive caching of responses generated by the LLMs, which allows for continuous monitoring and improvement of the caching databases. Due to which, overall performance and efficiency of LLM applications are enhanced significantly.

In general, innovative aspects of the subject matter described in this specification provide a computer-implemented method for adaptive caching of a response generated by a LLM for a received prompt. The method includes processing data associated with the response and the received prompt. The method includes updating a respective value of each of a plurality of features to generate a discrete time series based upon the data. The method further incudes generating a plurality of caching metrics based upon a plurality of respective values of one or more features of the plurality of features. The method further includes generating a safety score corresponding to the plurality of caching metrics. The method includes storing the data in a caching database. It should be noted that the data is based, at least in part, upon the safety score, a response time predicted for a request associated with the received prompt, and metadata associated with the data.

The present disclosure further describes a system for implementing the method provided herein. The present disclosure also describes computer-readable media coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Various examples in accordance with the present disclosure will be described with reference to the drawings, in which.

Like reference numbers and designations in the various drawings indicate like elements.

DETAILED DESCRIPTION

Figure 1:
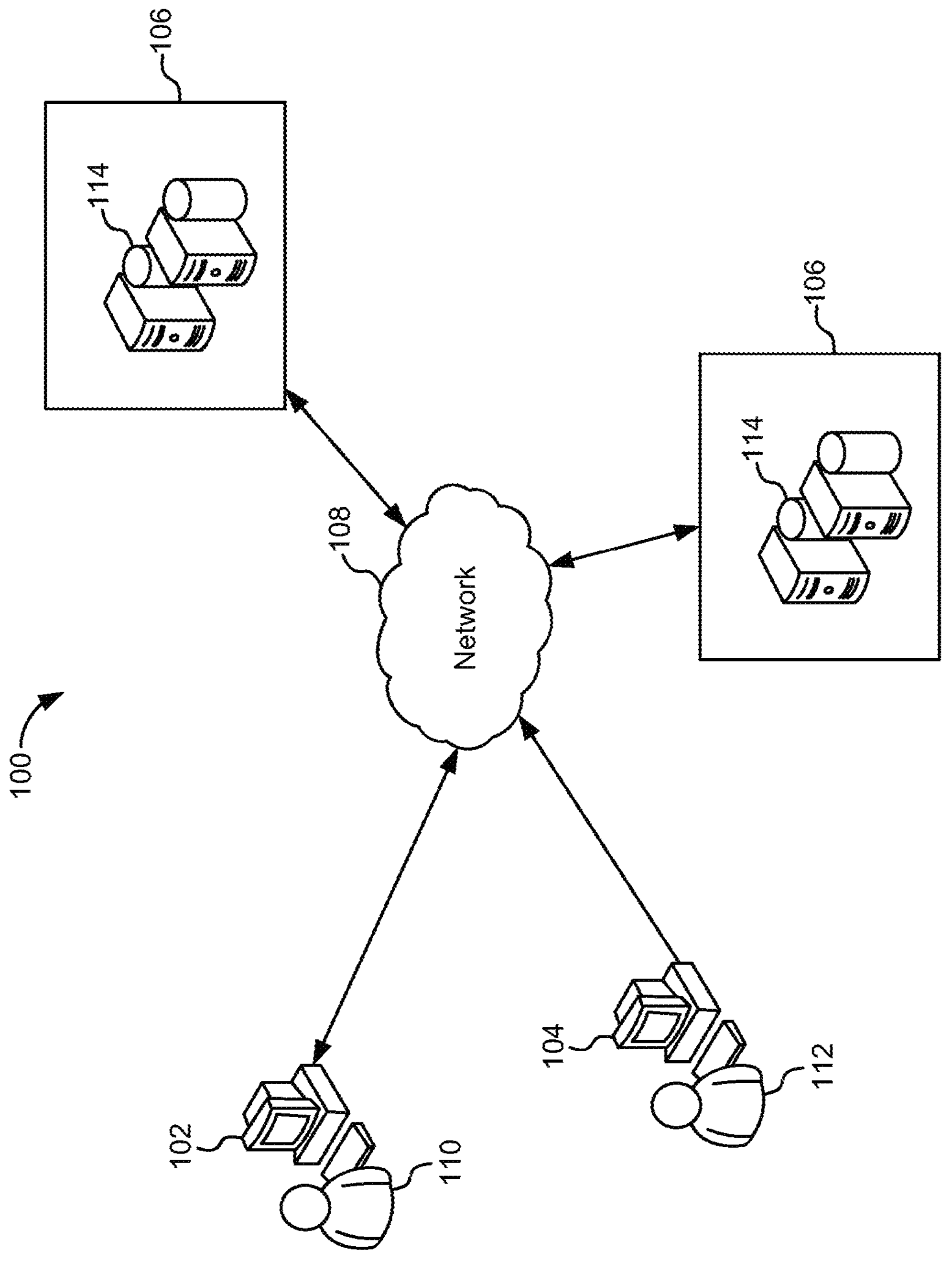
FIG. 1 illustrates an example environment that may be used to execute implementations of the present disclosure.

In the following description, various examples will be illustrated by way of example and not by way of limitation in the figures of the accompanying drawings. References to various examples in this disclosure are not necessarily to the same examples, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," by way of an example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to;" it specifically indicates open-ended inclusion or membership in the so-described combination, group, series, and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring example examples.

The specification and drawings are to be regarded in an illustrative rather than a restrictive sense. It will, however, be evident that various modifications and changes may be made thereunto without departing from the broader spirit and scope of the disclosure as set forth in the claims.

With the advent of Generative Artificial Intelligence (Gen AI) systems, enterprises are adopting the Gen AI systems to support execution of various tasks/processes. For example, a Gen AI system may support communications and interactions, and processes in software systems to support decision-making within the enterprises. Multiple applications within a corporate network environment may use and interact with Large Language Models (LLMs) of the Gen AI systems to provide input and/or data for the execution of a wide variety of tasks, such as, human computer interactions (e.g., question and answering), automating process execution, process planning, generating step-by-step procedures for the process execution, performing data analysis, and/or the like.

The LLMs operate by processing inputs to generate coherent, and contextually appropriate responses. However, the LLMs face significant operational challenges including performance degradation due to a need to repeatedly generate the responses from scratch upon receiving the same input multiple times. Such operational challenges not only slowdown overall responsiveness but also strain computational resources, which may result in higher costs, and may limit scalability and concurrent user requests handling. Additionally, the lack of a systematic way to store and retrieve previously processed data (e.g., the responses and corresponding prompts) by the LLMs may make it difficult to maintain consistent performance levels and meet real-time application demands, and, thereby, limiting usability and overall reliability of the LLMs in various interactive settings.

Various methods/approaches are available for addressing these challenges faced by the LLMs due to repetitive computations and resource inefficiencies. The available methods involve implementing caching databases for the LLMs along with primary/main databases. A main/primary database holds original data (e.g., initially created, collected, or stored data) related to the prompts and the responses in its most accurate and authoritative form. In some examples, the main/primary database may correspond to a knowledge database. A caching database temporarily stores copies of the original data to improve performance and reduce access times. Further, the caching databases enable the LLMs to store and retrieve previously processed data efficiently, thereby significantly reducing response times and computational overhead. The integration of the caching databases into an LLM architecture marks a pivotal advancement, enhancing their usability across various interactive platforms and reinforcing their role in modern computational applications.

However, the available methods employing the caching databases for the LLMs fail to adhere to Responsible Artificial Intelligence (RAI) principles within Gen AI applications. Therefore, despite the available methods, the caching databases implemented for the LLMs continue to face several challenges. One of the challenges is maintaining data consistency between the caching databases and the main/primary databases, as relaxed consistency models employed to balance performance of the caching databases with consistency may lead to occasional inconsistencies or stale data, impacting reliability of responses. The relaxed consistency models may lead to the occasional inconsistencies or stale data when the original data stored in the main/primary databases changes/varies over time. The original data may be changed in the main/primary databases due to various reasons including, but not limited to, data updates, data corrections, system integrations, real-time data generation, user interactions, automated processes, and external data sources. Therefore, the caching databases that store copies of the original data need to be updated or validated to ensure that the caching databases reflect the latest state of data. Failure in updating or validating the caching databases by the relaxed consistency models may lead to stale or inconsistent data being served to users, which impacts the accuracy and reliability of the caching databases. Such a discrepancy impacts the reliability of responses generated by the LLM, as the caching databases may not always reflect the most recent updates from the main/primary databases.

Another challenge lies in adaptive cache management. While the caching databases have evolved to include parameters like Time to Live (TTL) settings and eviction policies based on access patterns, the caching databases often rely on static rules rather than dynamic adaptation to changing workload conditions or data access patterns. This limitation may affect efficiency and responsiveness of caching databases, particularly in environments with fluctuating data dynamics or varying access frequencies.

Furthermore, yet another challenge lies in scalability of the caching databases. As the LLMs and their applications grow in complexity and scale, the caching databases may struggle to maintain optimal performance under increasing data volumes and user interactions. Scaling the caching databases while ensuring consistent and efficient data management across distributed systems poses a significant challenge. Also, the absence of implementations of basic practices such as Continuous Integration and Continuous Deployment/Delivery (CICD), and Continuous Testing in Continuous Monitoring (CTCM) further exacerbates the challenges faced by the LLMs, as these practices are critical for maintaining stability, reliability, and production readiness.

Additionally, monitoring improvements in performance of the caching databases post-production is also not a standard feature in the Gen AI applications. This oversight often leads to missed opportunities for optimization and efficiency gains, as performance of the caching databases significantly impacts overall performance. Moreover, determining what data to store in the caching databases, how to store relevant values of the data in the caching databases, and identifying appropriate metrics for continuous tracking and improvement of the caching databases is challenging. Without effective metrics and monitoring, gauging effectiveness of caching strategies and making necessary adjustments for optimization of the caching databases becomes difficult.

Therefore, while the caching databases have significantly enhanced the performance and efficiency of the LLMs by addressing computational intensity and bandwidth constraints, there is a need to optimize data consistency, adaptive management, and scalability to meet the evolving demands of modern AI applications.

In view of this, implementations of the present disclosure utilize the LLMs to ensure adherence to the RAI principles while simultaneously enhancing efficiency and performance of the caching databases associated with the LLMs. Implementations of the present disclosure employ an adaptive heuristic approach for adaptive caching of responses generated by the LLMs. The adaptive heuristic approach involves dynamically adjusting data (including the responses generated by the LLMs and associated prompts) of the caching databases to evolving data patterns and workloads, while ensuring that the caching databases consistently hold the most relevant and frequently accessed data/information. Such a dynamic adjustment significantly improves response times and overall system performance.

The adaptive heuristic approach further utilizes advanced machine learning techniques, specifically classification models such as XGBoost, to identify metadata such as historical cache access patterns, trends. By analyzing the historical cache access patterns, the adaptive heuristic approach enhances performance of the caching database, while boosting cache hit rates and reducing cache miss rates through improved precision in cache predictions. Further, a combination of the metadata analysis with the machine learning techniques allows for a deeper understanding and anticipation of data request patterns which may lead to a more effective caching strategy that adapts to user needs and workload fluctuations. In addition, analyzing the metadata provides insights into the frequency, recency, and nature of data access, while the machine learning techniques offer predictive power. Such a dual approach facilitates effective prioritization and management of data within the caching database. As a result, the cache hit rates may be increased and the cache miss rates may be decreased, and overall performance and efficiency of the caching database are significantly enhanced.

The adaptive heuristic approach involves generating a discrete time series based upon the data and generating caching metrics based on the discrete time series. The discrete time series is generated by employing time series forecasting methods to monitor and predict total response times, further refining cache management. The adaptive heuristic approach incorporates the time series forecasting methods to analyze the cache access patterns. The discrete time series provides a graphical representation of the cache hit and miss rates over time, enabling monitoring and prediction of overall response times. By observing the trends (such as fluctuations in cache hit and miss rates, and changes in response times), management of the cache database may be refined, ensuring that the caching strategy remains effective even as conditions (for example, shifts in user behavior, changes in data access patterns, and/or alterations in workload intensity) evolve.

The discrete time series may further indicate signs of drift in the LLM, decay, or training-serving skew. The drift in the LLM may occur when statistical properties of predictive variables shift, leading to diminished accuracy. The decay may refer to a decreased accuracy of the LLM over time due to environmental changes. The training-serving skew may occur when there is a significant disparity between the training data and the data used in a serving environment. In response to these challenges, retraining or fine-tuning the LLM with recent data may be necessary. Therefore, with the discrete time series, robustness of the LLM may be continuously monitored and requirement for retraining or fine-tuning of the LLM may be determined. The re-training or fine-tuning may include updating parameters of the LLM, incorporating new data into the training set, or revising structure of the LLM as needed to better align with the current trends. To ensure timely adaptation, automatic triggers for LLM updates may be set up based on specific thresholds, such as significant drops in accuracy or increases in cache miss rates. Further, a feedback loop may be established where predictions are continuously compared with actual outcomes. The adaptive heuristic approach helps in identifying discrepancies and facilitates timely adjustments to maintain the accuracy and effectiveness of the caching database. Therefore, the adaptive heuristic approach effectively helps in adapting the caching database to the changing trends and operational requirements, while enhancing overall performance and efficiency of the caching database.

The adaptive heuristic approach further involves computing a safety score for evaluating performance of the caching databased based on the generated caching metrics. The safety score helps in identifying whether the performance of the caching databases meets a safety threshold, with normalization techniques applied to ensure accuracy. This comprehensive approach provides a robust solution to the challenges of data consistency, adaptive management, and alignment with Gen AI applications.

FIG. 1 illustrates an example environment 100 that may be used to execute implementations of the present disclosure. In some examples, the example environment 100 enables adaptive caching of responses generated by Large Language Models (LLMs).

As depicted in FIG. 1, the example environment 100 includes computing devices 102 and 104, back-end systems 106, and a network 108. In some examples, the computing devices 102 and 104 are used by respective users 110 and 112 to log into and interact with computing platforms executing applications according to implementations of the present disclosure. Examples of the computing devices 102 and 104 may include a server, a notebook, a desktop, a netbook, smartphones, laptops, a tablet, and/or voice-enabled devices. It is contemplated that implementations of the present disclosure may be realized with any appropriate type of computing device. In some examples, each of the computing devices 102 and 104 may include a web browser application executed thereon, which may be used to display one or more web pages of a computing platform executing applications. In some examples, each of the computing devices 102 and 104 may display one or more Graphical User Interfaces (GUIs) that enable the respective users 110 and 112 to interact with the computing platform.

In some examples, the network 108 may correspond to a communication network. Examples of the network 108 may include, but are not limited to, a Local Area Network (LAN), a Wide Area Network (WAN), the Internet, Wi-Fi, Long Term Evolution (LTE), Worldwide Interoperability for Microwave Access (WiMAX), General Packet Radio Services (GPRS), or a combination thereof. The network 108 communicatively couples or connects the computing devices 102 and 104 with the back-end systems 106. In some examples, the network 108 may be accessed over a wired and/or a wireless communication link. For example, a computing device like smartphone may utilize a cellular network to access the network 108.

In some examples, one or more of the back-end systems 106 may be implemented as an on-premises system that is operated by an enterprise or a third-party engaged in cross-platform interactions and data management. In some examples, the back-end systems 106 may be implemented as an off-premises system (for example, a cloud or an on-demand system) that is operated by an enterprise or a third-party on behalf of an enterprise. In some examples, the back-end systems 106 may be implemented in a cloud environment. For simplicity, the back-end systems 106 depicted in FIG. 1 may be a cloud environment that is intended to represent various forms of servers including a web server, an application server, a proxy server, a network server, a server pool, and/or the like.

Figure 2:
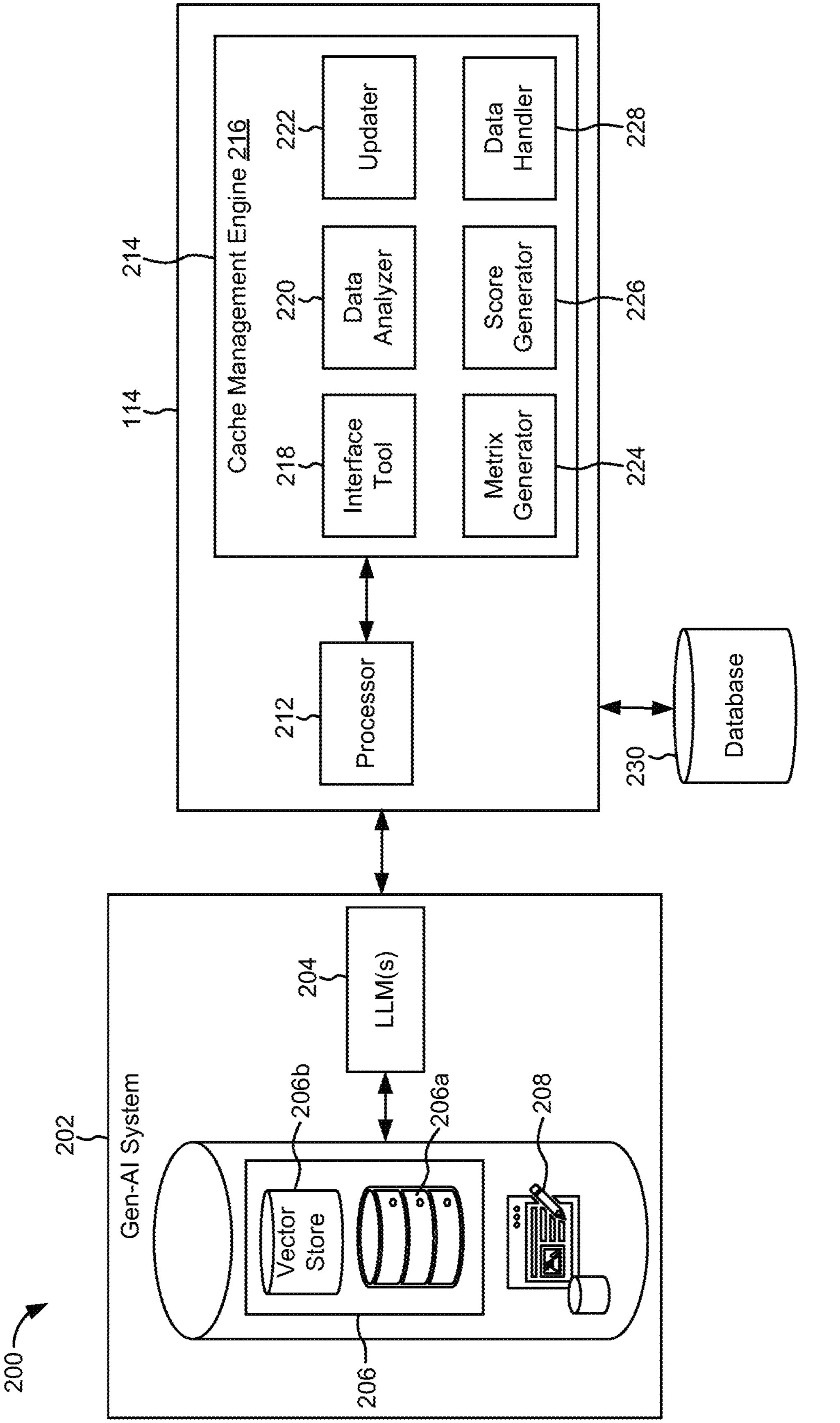
FIG. 2 illustrates a block diagram of a system for adaptive caching of responses generated by Large Language Models (LLMs), in accordance with implementations of the present disclosure.

In some examples, each of the back-end systems 106 includes one or more cache management systems 114. A cache management system 114 may host components of enterprise systems and applications. Also, the cache management system 114 accepts requests from the users 110 and 112 through the respective computing devices 102 and 104 for services being provided by the enterprise systems and the applications. The requests received from the users 110 and 112 through the respective computing devices 102 and 104 may be prompts for one or more tasks. Examples of the tasks may include question-answering, automation of process execution, process planning, generation of step-by-step procedures, performing of data analysis. In some implementations, the prompts may be used as a mode of interaction with a Gen AI system (as depicted in FIG. 2) for the one or more tasks. The Gen AI system includes one or more Large Language Models (LLMs) and associated one or more caching databases. The LLM may be used for performing the tasks requested in the prompts. Results of the tasks may be temporarily stored in a caching database as responses generated by the LLM.

In response to the requests/prompts, the cache management system 114 (or the caching database associated with the LLM) receives responses from the LLM of the Gen AI system. The cache management system 114 forwards the responses to the computing devices 102 and 104.

According to implementations of the present disclosure, the cache management system 114 may be adapted for managing storing of the responses generated by the LLM in the caching database, which is described in detail in conjunctions with figures below.

FIG. 2 illustrates a block diagram of a system 200 for adaptive caching of responses generated by LLMs 204, in accordance with implementations of the present disclosure. FIG. 2 is explained in conjunction with FIG. 1. As depicted in FIG. 2, the system 200 includes a Gen AI system 202, and a cache management system 114.

The Gen AI system 202 includes one or more LLMs 204 (also referenced herein as foundation models). In some implementations, the Gen AI system 202 includes a hosting infrastructure (not depicted in FIG. 2) to host the LLMs 204. Examples of the hosting infrastructure may include cloud computing platforms or the like. The LLMs 204 function as foundation models in the Gen AI system 202. In some examples, the LLMs 204 may be provided by one or more third parties. In some examples, the LLMs 204 may be provided by one or more enterprises, which deploys the cache management system 114. The LLMs 204 understand, generate, and process human language. The LLMs 204 are trained using deep learning techniques and based on extensive datasets including diverse sources, allowing them to learn patterns, context, and nuances in human language. The LLMs 204 perform language processing tasks including text generation, translation, summarization, question-answering, and the like. In some examples, the LLMs 204 refer to models that use deep learning techniques and have a plurality of parameters, which may range from millions to billions. Further, the LLMs 204 are accessed through an Application Programming Interface (API), which serves as a gateway for receiving requests or queries in a form of processed text prompts.

An LLM 204 receives the requests/prompts from the computing device 102-104 through the cache management system 114 and generates the responses for the requests/prompts. The LLM 204 may generate the responses/contents based on any appropriate modality (for example, text, audio, image, video, and/or the like). In some examples, the responses may correspond to one or more of the tasks being represented by the requests/prompts.

While implementations of the present disclosure are described in further detail herein with non-limiting reference to the LLMs 204, it is contemplated that implementations of the present disclosure may be realized using any appropriate foundation models or Machine Learning (ML) models, or Artificial Intelligence (AI) models.

The Gen AI system 202 further includes a primary database 206 and a caching database 208. The primary database 206 may also be referenced herein as a main database or a knowledge database. The primary database 206 stores original and authoritative data (most accurate, reliable, and trusted data). The data may include responses generated by the LLM 204 and the prompts received by the LLM 204 for generation of the responses. Therefore, the primary database 206 serves as the central source of truth for data, from which information is retrieved, managed, and updated. The primary database 206 as the central source of truth for data includes definitive/accurate version of the data (for example, definitive version of generated responses by the LLMs 204), ensuring that any changes or updates are made in the primary database 206 first before being reflected in other systems like the caching database 208.

In some implementations, the primary database 206 may include a long-term memory **206*a* and/or a vector store 206*b*. The long-term memory 206*a* may store the data including the responses generated by the LLM 204 and the associated prompts for an extended period of time. The data may be used for generation of subsequent responses by the LLM 204. In some examples, the long-term memory 206*a* may be implemented utilizing additional components such as the vector store 206*b*. Therefore, the long-term memory 206*a* may store the data or embeddings that the LLM 204 may access and use to generate the responses. In some other examples, the long-term memory 206*a* may be incorporated into the LLM 204 itself. Therefore, the LLM 204 may include the long-term memory 206*a*** as an internal memory module.

The vector store **206*b* (also referenced herein as vector database, knowledge/graph database) may be a database that manages and retrieves high-dimensional vector representations, or embeddings, of the data. The vector store 206*b* may enable semantic search by finding and retrieving the most relevant vectors based on similarity for the given prompt. The vector store 206*b* may be queried to retrieve relevant historical data, similar questions, or contextually appropriate information that helps in generating a meaningful and contextually relevant prompt for the LLM 204**.

Therefore, the primary database 206 serves as a reference for the original data or the vector embeddings. It should be noted that the term "primary database," "long-term memory," and "vector store" may be used interchangeably throughout the draft.

The caching database 208 acts as a high-speed repository for storing the data temporarily. In some implementations, the caching database 208 may be a distributed synchronized caching database. The data includes the responses generated by the LLM 204 and the associated prompts/requests received by the LLM 204 for generation of the responses. In some examples, the caching database 208 may leverage in-memory capabilities from a data structure server (e.g., Redis) to provide rapid access and efficient management of the data. Therefore, the caching database 208 supports various data structures including strings, hashes, lists, sets, and sorted sets.

In some examples, the caching database 208 may be implemented as an in-memory module, or a disk-based memory, or a combination thereof. Implementation of the caching database 208 in various options may depend on access patterns of the caching database 208 and cost considerations, which further optimizes performance of the caching database 208. In an example, the caching database 208 may be implemented as the in-memory module for high-speed access to frequently requested data. In another example, the caching database 208 may be implemented as the disk-based caching option for larger datasets where cost is a concern. In yet another example, the caching database 208 may be implemented as the combination of the in-memory module and the disk-based memory to balance speed and cost-efficiency. Additionally, a specialized cache data structure for the caching database 208 may be tailored to a specific use case to further enhance performance of the caching database 208. For example, a tree data structure for prefix-based searches may be used to improve an efficiency of querying and retrieving data related to the prompts, while making it easier to handle autocomplete or similar functionalities.

In some examples, the data stored in the caching database 208 may also be associated with timestamp, user/computing device identifier (ID), a unique ID, tags/labels, and/or the like. The tags/labels may indicate trends/popularity, one or more tasks, latency, and/or the like associated with the data. Further, it should be noted that the data stored in the caching database 208 may adhere to security and privacy standards. For example, if the data is sensitive, then the data has to be encrypted in the caching database 208 and access to the respective data may be controlled meticulously.

The data in the caching database 208 may be dynamically managed/updated (including storing and removing of the data) by the cache management system 114, which is described in detail below.

The cache management system 114 includes a processor 212, and a memory 214. In some implementations, the cache management system 114 includes more than one processor. The processor 212 may include, for example, microprocessors, microcomputers, microcontrollers, digital signal processors, central processing units, state machines, logic circuits, and/or any devices that manipulate data or signals based on operational instructions. The memory 214 may be a non-volatile memory or a volatile memory. Examples of the non-volatile memory may include, but are not limited to, a flash memory, a Read Only Memory (ROM), a Programmable ROM (PROM), Erasable PROM (EPROM), and Electrically EPROM (EEPROM) memory. Examples of the volatile memory may include, but are not limited, a Dynamic Random Access Memory (DRAM), and a Static Random-Access Memory (SRAM).

The memory 214 may be communicatively coupled to the processor 212. The memory 214 stores a plurality of instructions, which upon execution by the processor 212, cause the processor 212 to perform various operations described in the present disclosure. The memory 214 includes a cache management engine 216. The plurality of instructions stored in the memory 214 may define operations of the cache management engine 216. The cache management engine 216 includes an interface tool 218, a data analyzer 220, an updater 222, a metric generator 224, a score generator 226, and a data handler 228. In some implementations, the data analyzer 220, the updater 222, the metric generator 224, the score generator 226, and the data handler 228 may use ML models, statistical models, and/or the like for adaptively managing adaptive caching of the responses generated by the LLM 204 in the caching database 208 based on changing patterns of response generation.

In an implementation, the cache management engine 216 may have an associated database 230. The database 230 stores various data and intermediate results generated by the components 218-228. For example, the database 230 may include a prompt received for generating a response, a response generated corresponding to the prompt, information regarding a cache hit, a cache miss, updated values of different features like time taken to generate the response, and the like, which are described in detail below.

The interface tool 218 receives the data associated with the response generated by the LLMs 204 and the prompt received for generation of the respective response. In an example, the data is transmitted to the data analyzer 220 via the interface tool 218. In another example, the data is further stored in the database 230 for further utilization by the components 220-228 via the interface tool 218. In yet another example, the data may be stored in the database 230 after transmitting the data to the data analyzer 220. By way of an example, the interface tool 218 is used to render the results of analysis performed by the components 220-228. By way of another example, the interface tool 218 may be used by an administrator to provide inputs to the cache management engine 216.

After receiving the data, the data analyzer 220 processes the received data for identifying one or more of: outliers, short-term fluctuations, a level, a trend, an anomaly, and/or a seasonality of the received prompt and/or the response.

The outliers are data points that significantly deviate from majority of a dataset of the response and/or the prompt. For example, the outlier may include the data points deviating either higher or lower than (or outside) a normal range of values. For example, consider a scenario where the LLM 204 consistently generates multiple responses with response times (time consumed to generate the response) between 50 milliseconds (ms) to 100 ms, but occasionally the LLM 204 generates a response by consuming 1 second. Such a response with unusual high response time may be identified as an outlier.

In some implementations, the data analyzer 220 may process the data associated with the prompts/responses using Interquartile Range (IQR) to identify the outliers. The IQR may be a measure of statistical dispersion or variability in the data (prompt/responses). The IQR may be used to understand a distribution of the data and to detect the outliers from the data. The IQR may provide the distribution of the data by representing a range within which middle 50% of values associated with the prompts/responses fall, describing a central portion of the data. To calculate the IQR, the data analyzer 220 may arrange/sort the data points of the prompts/responses in an ascending order. The data analyzer 220 may then divide the data points into quartiles, for example, with a first quartile (Q1) representing 25th percentile and a third quartile (Q3) representing 75th percentile. Based on the quartiles, the data analyzer 220 may determine the IQR. For example, the IQR may be determined by subtracting Q1 from Q3, resulting in the range that covers the middle half of the data. Therefore, the IQR may aid in understanding the spread and central tendency of the data. Further, to identify the outliers using the IQR, the data analyzer 220 may establish boundaries beyond which data points are considered unusual. Specifically, any data points falling below $Q1-1.5\times IQR$ or above $Q3+1.5\times IQR$ are flagged as the outliers.

The short-term fluctuations refer to temporary and minor variations in data values of the prompt and/or the response, occurring over a brief period. In some implementations, a variation of a cache hit ratio may depict the short-term fluctuations. For example, the cache hit ratio may vary between 85% and 90% over a few hours, due to intermittent spikes in the prompt and/or the response. Such a variation of the cache hit ratio may depict a short-term fluctuation. The cache hit ratio may be a data value corresponding to the prompt and/or the response. The cache hit ratio is a percentage of cache requests that are successfully served by the caching database 208 (e.g., cache hits), rather than requiring generation of a response by the LLM 204. A high cache hit ratio means that the cache management system 114 is efficiently managing the caching database 208, which leads to faster response times and reduced load on the primary database 206. Further, the high cache hit ratio may indicate that the data is readily available most of the times in the caching database 208, which may increase reliability of the system 200. In an example, the cache hit ratio may be calculated as per equation (1), given below:

$$\text{Cache hit ratio} = (\text{Total cache hits}/\text{Total requests}) \times 100 \quad \text{equation (1)}$$

Here, in equation (1), the total cache hits correspond to a number of times a request for a response is successfully fulfilled by the caching database 208, which means that the requested response is available in the caching database 208. The total requests correspond to a total number of requests made to the caching database 208. The total requests include both the cache hits and cache misses. The cache misses indicate that cache requests that were not served successfully by the caching database 208 (e.g., the requested data is not available in the caching database 208) Tracking the total number of requests helps to understand load on the caching database 208 and to plan for scale-up or scale-down strategies. For example, if the total requests received are 1000 and 850 of the total requests resulted in the cache hits (e.g., the requested data is found in the caching database 208), in such a case the cache hit ratio may be 85%, e.g. [(850/1000)×100].

The level represents an average or a baseline value of a data series of the prompts/responses over a specific period, indicating its central tendency. For example, if an average response time for the LLM 204 remains around 150 ms over a month, then the average response time of 150 ms signifies the level during that period.

The trend involves observing a long-term movement or direction of data values of the prompts/responses, over an extended time frame. The trend shows whether the data values of the prompts and/or the responses corresponding to the prompts/responses are generally increasing, decreasing, or remaining relatively stable. An example may be a gradual increase in the cache hit ratio over several months, rising from 60% to 80%, indicating an overall improvement in cache efficiency.

The anomaly may be data points or patterns of the prompt and/or the responses that deviate significantly from expected behavior of the caching database 208, indicating unusual or unexpected events. In some implementations, the anomaly may be identified based on a cache miss ratio. For example, a sudden spike in the cache miss ratio from 10% to 50% without a clear reason may be flagged as an anomaly, which suggests potential issues such as a configuration problem in the caching database 208, or introduction of new or less efficient prompt types. The cache miss ratio is a percentage of the total requests that result in the cache misses, indicating how often the requested response is not available in the caching database 208 and needs to be generated from the LLM 204. If the cache miss ratio is high, it may indicate that size of the caching database 208 is too small or the caching database 208 is not managed effectively to keep the most relevant data in the caching database 208. The cache miss ratio may be calculated as per the equation (2), given below:

$$\text{Cache miss ratio} = (\text{Total cache misses}/\text{total requests}) \times 100 \quad \text{equation (2)}$$

Here, in equation (2), the total cache misses correspond to a number of times the request for the response is not fulfilled by the caching database 208. This means the requested response is unavailable in the caching database 208. The total requests correspond to the total number of requests made to the caching database 208, which includes both the cache hits and the cache misses. For example, if total requests received are 1000 and 150 of the total requests resulted in cache misses (e.g., the requested data is not found in the caching database 208), in such a case the cache miss ratio may be 15%, e.g. [(150/1000)×100].

In some implementations, the data analyzer 220 may process the data associated with the prompts/responses using an unsupervised learning technique, for example, isolation forest, to identify the anomaly. The isolation forest works by isolating the anomaly instead of the most common data points. As the isolation forest is known, it not described in detail herein.

The seasonality refers to recurring patterns or fluctuations of the prompts and/or the responses that follow a specific timeframe, such as daily, weekly, or seasonal variations. The seasonality reflects changes in prompt types or response characteristics tied to specific times of the year or cyclic events. For example, a spike in requests related to holiday-related prompts/queries during festive seasons demonstrates a seasonal pattern in the prompt and the response.

The data analyzer 220 is communicatively coupled to the updater 222 for providing the processed data to the updater 222.

The updater 222 receives the processed data and updates a respective value of each of a plurality of features to generate a discrete time series based upon the processed data. The discrete time series may refer to univariate time series, which reflects a state of the caching database 208 and shows trends in logged data within the caching database 208.

In some examples, the plurality of features includes one or more of a total number of requests made to the caching database 208 (e.g., the total requests), a total number of times requested data is found in the caching database 208 (e.g., the total cache hits), a total number of times requested data is not found in the caching database 208 (e.g., the total cache misses), a total number of times data associated with the response and the received prompt is removed from the caching database 208, a total response time for received requests, a total number of times a particular key associated with the received prompt is accessed, a size of the response associated with the particular key, and/or a time duration elapsed since the particular key is last accessed (e.g., Time to Live (TTL) settings).

The total number of times data associated with the response and the received prompt removed from the caching database 208 may refer to total evictions. The total evictions count the number of times a piece of data is removed from the caching database 208. An eviction may occur when the caching database 208 reaches its capacity and needs to make a space for new data. Frequent evictions may suggest that the size of the caching database 208 is too small, or the cache management system 114 is not effective at keeping the most relevant data. Further, determining a cache eviction ratio based on the total evictions helps to evaluate how often data is being removed from the cache, which may indicate the efficiency and effectiveness of the caching database 208. The cache eviction ratio may be calculated as per equation (3), given below:

$$\text{Cache eviction Ratio} = \frac{\text{Total number of cache operations}}{\text{Total Evictions}} \times 100 \quad \text{equation (3)}$$

The total number of cache operations may include total accesses, total entries, removal, or other relevant operations performed on the caching database 208. For example, if the caching database 208 handles 1000 operations during a period and 100 entries (e.g., 100 pieces of the data) are evicted during the period, the cache eviction ratio may be 10%, e.g. (100/1000)×100.

In some examples, the updater 222 may generate the discrete time series using forecasting methods/time series forecasting methods. The updater 222 may generate the discrete time series by applying the forecasting method on a total response time based on its past values, while accounting for the trend and seasonality (identified from the processed data) and the updated plurality of features.

In some other examples, the updater 222 may generate the discrete time series using Exponentially Weighted Moving Average (EWMA). In accordance with the EWMA, the updater 222 may assign weights to the updated plurality of features, smoothen the short-term fluctuations (identified from the processed data), and highlight longer-term trends or cycles to generate the discrete time series.

In some other examples, the updater 222 may generate the discrete time series using holt-winters method. Using the holt-winters method, the updater 222 may process the level, the trend, and the seasonality identified from the processed data to generate the discrete time series.

By way of an example, consider a scenario where the system 200 handles requests for product information on an e-commerce platform. Over a period, the system 200 records "300" requests related to a specific product identifier (ID). Out of the "300" requests, the data is found in the caching database 208 (cache hits) for "260" requests, while no data found for "40" requests (cache misses). In such a scenario, the updater 222 may then update the corresponding features (for example, the number of cache hits and the cache misses) to generate the discrete time series. Further, the updated features may be used/analyzed to generate the discrete series.

For example, the updater 222 may track the plurality of features every hour throughout a day. Initially, the updater 222 collects the data associated with the features at each hour, such as 40 cache hits and 5 cache misses in hour 1, 45 cache hits and 7 cache misses in hour 2, and the like. The collected data (updated values of features) of every hour is then organized into a discrete time series, where each entry corresponds to a specific hour and reflects the collected and updated data corresponding to a feature. By compiling the collected and updated data into the discrete time series, such as [40, 45, 55, 50, 48, 52, 58, 62 . . . ] for cache hits and [5, 7, 8, 6, 10, 9, 11, 12 . . . ] for cache misses, the updater 222 may analyze trends over time. The examples provided herein use specific values and percentages for clarity. The disclosure is not limited to these examples and exact numbers but applies broadly across diverse scenarios and scales.

By way of another example, if the caching database 208 receives "50" requests and "10" of these are cache misses, the updater 222 adjusts respective feature values accordingly. Updating the feature values helps in tracking the performance of the caching database 208 over time by maintaining a record of various features that influence caching decisions. For example, if a prompt such as "How do I reset my password?" is requested "150" times, a value corresponding to the feature "the total number of requests made to the caching database 208 is incremented by "150". If, out of these "150" requests, "120" are cache hits and "30" are cache misses, these numbers are updated in their respective features.

The updater 222 may be operatively coupled to the metric generator 224 and provide the updated plurality of respective values of one or more features of the plurality of features to the metric generator 224.

The metric generator 224 generates a plurality of caching metrics based upon the updated plurality of respective values of the one or more features of the plurality of features. The caching metrics may provide insights related to the efficiency and effectiveness of the caching database 208. For example, the plurality of caching metrics may include a cache hit rate and a cache miss rate. The cache hit rate measures the percentage of requests successfully served from the caching database 208. The cache miss rate indicates how often requested data is not found in the caching database 208. Other caching metrics may include response time measurements. The response time measurements involve comparing the time taken to retrieve data/response from the caching database 208 versus generating or providing a new response by the LLM 204 for a given prompt. The metric generator 224 may be communicatively coupled to the score generator 226 and may provide the plurality of caching metrics to the score generator 226.

The score generator 226 generates a safety score corresponding to the plurality of caching metrics. The safety score reflects performance of the caching database 208 in terms of reliability and consistency. The safety score may be calculated to assess the overall reliability and effectiveness of the caching database 208.

In some implementations, the score generator 226 may generate a metric score by aggregating value of the plurality of caching metrics. In some examples, for the metric score that is not normalized, a linear regression sigmoid function may be applied on the plurality of caching metrics to normalize the metric score. Normalization may involve transforming the metric score to a standard range, such as 0 to 1. Based on the metric score, the score generator 226 may generate the safety score. It should be noted that the safety score is inversely proportional to a metric score generated for the plurality of caching metrics. If the metric score is high, the safety score may be low and vice versa. It means that as the metric score increases (or decreases), the safety score decreases (or increases) accordingly. The relationship between the metric score and the safety score indicates that there is an inverse correlation between the two variables (e.g., the metric score and the safety score), when one goes up, the other goes down, and vice versa. For example, a high safety score may indicate that the caching database 208 is effectively managing requests and serving responses promptly, while a low safety score may suggest frequent cache misses or slow response times. The score generator 226 may be communicatively coupled to the data handler 228 and may provide the safety score to the data handler 228.

The data handler 228 stores the data in the caching database 208. In some implementations, the data handler 228 stores the data, at least in part, in the caching database 208, depending upon the safety score, a response time predicted for a request associated with the received prompt, and metadata associated with the data. The metadata includes one or more of a last modified date, a reusability score, a usage count, a size of the received prompt, a size of the response, a response time to generate the response, end-user ratings, a percentage of time the response is correctly generated, a validity period, a trend associated with the received prompt, and/or a cost associated with generating the response. By way of an example, if a response to a prompt "How to fix a car" is stored, its metadata may include when it is last updated and how often it is accessed. This step ensures that the caching database 208 maintains up-to-date and relevant information, which helps in quick retrieval and efficient data management.

In some other implementations, the data handler 228 stores the data in the caching database 208 based on a volatility or variability of the response. In some examples, the data handler 228 may measure dispersion of the plurality of caching metrics from their average values by employing statistical methods such as, for example, standard deviation, which is known and not further described herein. The measured dispersion depicts the volatility or variability of the response, which helps in quantifying how much the response data fluctuates over a given period. Further, the data handler 228 may check the volatility or variability of the response with respect to a predetermined variability threshold value. When the volatility or variability of the response is greater than or exceeds the predetermined variability threshold value, the data handler 228 may store a partial data or no data in the caching database 208. The partial data may include partial results, computation results, and/or the like. For storing the partial data, the data handler 228 may break down the response into cacheable components, which may be recomposed to serve different types of prompts. When the volatility or variability of the response is lesser than or equal to the predetermined variability threshold value, the data handler 228 may store the data in the caching database 208.

In some other implementations, the data handler 228 stores the data in the caching database 208 based on a size of the data. Herein, the size of the data may refer to a size of the response included in the data. In some examples, the data handler 228 may determine the size of the data/response by measuring a number of bytes in a response payload. In some examples, the data handler 228 may determine the size of the data by measuring a size of main data content, as well as any additional elements like metadata, images, or files associated with the response. The data handler 228 then checks the size relative to a size threshold value. The size threshold value may represent the maximum acceptable size for the data to be stored in the caching database 208. When the determined size of the data is greater than the size threshold value, the data handler 228 may store a partial data (e.g., partial results, computation results, and/or the like) or no data in the caching database 208. When the determined size of the data is lesser than or equal to the size threshold value, the data handler 228 may store the data in the caching database 208.

In some other implementations, the data handler 228 stores the data in the caching database 208 based on frequently updated data. The data handler 228 determines if the response included in the data includes the frequently updated content/information. When the response does not include the frequently updated content/information, the data handler 228 may store a partial (e.g., partial results, computation results, and/or the like) or no data in the caching database 208. When the response includes the frequently updated content/information, the data handler 228 may store the data in the caching database 208.

The data handler 228 also removes the data from the caching database 208. The data handler 228 may remove the data, from the caching database 208, based at least in part upon, a last access time of the data, a number of access counts associated with a key corresponding to the data, a size of data of the response, an order of an entry of the data into the caching database 208, and a creation time of the entry of the data into the caching database 208 (may be collectively referred to as an eviction logic, which depicts an order for removing the data). For example, the data may be removed if it has not been accessed for an extended period, if its access count is low, or if its size is deemed excessive compared to predefined thresholds. Additionally, or alternatively, the data that is frequently updated, or exhibits high volatility, may be eligible for removal to avoid storing outdated or less relevant information. Therefore, the caching database 208 may be regularly validated for its performance and correctness, while simulating different load conditions to ensure resilience of the caching database 208.

Consider an example scenario where the prompt is "Where to watch a show ABC?". The response to the prompt may be frequently accessed, as the "show ABC" is very popular and trending. Therefore, the response may be stored in the caching database 208.

Consider another example scenario where the prompt is "Current weather of a X city?". The response to the prompt includes real-time weather conditions such as temperature, humidity, and precipitation for the specified X city. The metadata associated with the prompt and the response includes a last modified date of XXX, a usage count of 150 requests, a response size of 75 Kilobytes (KB), and last accessed on XXX. Due to the rapidly changing nature of weather data, which becomes outdated quickly, this type of data may not be stored in the caching database 208. The high volatility and frequent updates make it unsuitable for storage in the caching database 208.

Consider yet another example scenario where the prompt is "Detailed setup guide for configuring advanced settings in software Y?". The response to the prompt includes an extensive guide with multiple sections and detailed instructions, resulting in a response size of 500 KB. Given the substantial size of the complete response, the data handler 228 may store only the most frequently accessed sections of the guide in the caching database 208. In this case, sections like "Initial Configuration" and "Advanced Settings" may be stored, as these sections are the most requested parts of the guide. Conversely, a "Troubleshooting" section, which is accessed less frequently, may not be stored in its entirety in the caching database 208. Instead, only a summary or an index of the section "Troubleshooting" is retained, with a reference to fetch the full details if necessary.

Consider yet another example scenario where the prompt is "How to use a feature in software X". The response to the prompt provides instructions for an outdated version of software X. The metadata for the response includes a last modified date of XXX, a usage count of only 10 requests, a response size of 50 KB, and last accessed on YYY. Herein, the last modified data and the last accessed date may indicate that the data is no longer used recently. Therefore, due to the outdated nature of the data (e.g., the instructions) and the low frequency of access, the response may be removed from the caching database 208.

Therefore, the implementations according to the present disclosure dynamically adjusts caching of the responses generated by the LLM 204 based on evolving data patterns and workloads, while ensuring that the caching database 208 is consistently populated with the most relevant and frequently accessed data. As a result, overall response times and performance of the caching database 208 may be improved by reducing the need for repetitive computation and data retrieval.

Figure 3:
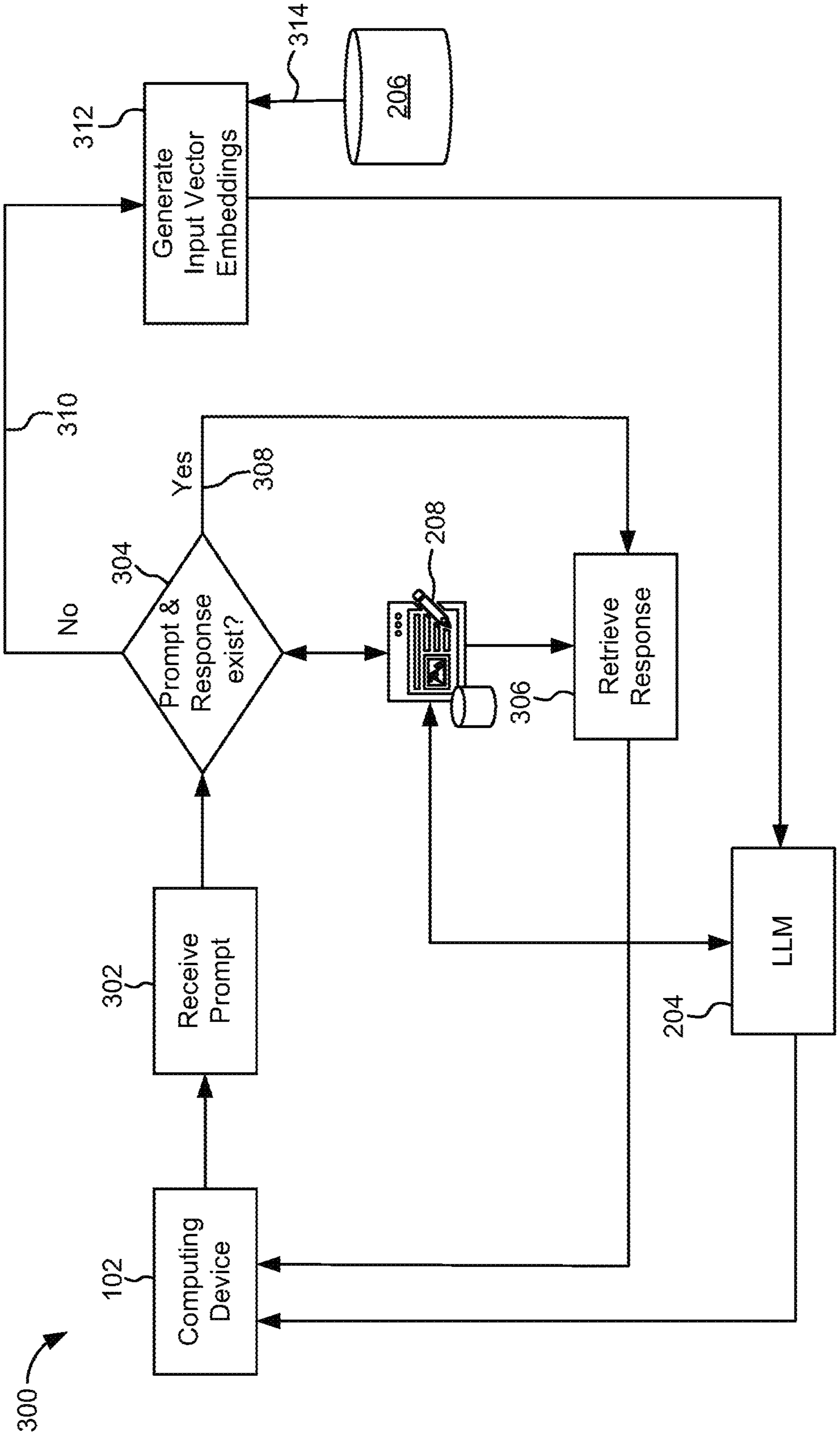
FIG. 3 illustrates an example process flow of dynamically managing storage or removal of the data in the caching database maintained for the LLM, in accordance with implementations of the present disclosure.

FIG. 3 illustrates an example process flow 300 of dynamically managing storage or removal of the data in the caching database 208 maintained for the LLM 204, in accordance with implementations of the present disclosure. FIG. 3 is explained in conjunction with FIGS. 1-2.

The cache management system 114 receives a prompt (query/input) 302 from the computing device 102. The prompt 302 may include a request for performing one or more tasks. The tasks may include question and answering (Q&A), summarization, sentiment analysis, and/or the like.

Upon receiving the prompt, the cache management system 114 (not shown in FIG. 3) perform determination 304 if the prompt 302 and an associated response 306 exist in the caching database 208. If the prompt 302 and the associated response 306 exist in the caching database 208, the cache management system 114 determines or updates the cache hit 308 and determines that there is no need to fetch the requested information from the primary database 206 or to generate a new response by the LLM 204 for the same received prompt. As a result, the cache management system 114 retrieves the response 306 from the caching database 208 for the received prompt.

In some implementations, after determining the cache hit 308, the cache management system 114 may also verify whether the response 306 exist in the caching database 208 for the received prompt 302 is not outdated and valid. For example, to determine whether the response 306 within the caching database 208 is not outdated and valid, timestamp or an expiration date of the response may be checked. Further, the timestamp of the response 306 may be compared with the current time or the time of the prompt 302 to ensure that the response 306 falls within a designated validity period. This is one example of how to determine if the response 306 is not outdated or invalid; however, other alternative methods (such as applying data integrity checks or using consistency and enterprise logic verifications) may also be employed to ensure that the response accurately reflects the most recent and relevant information. If it is determined that the prompt 302 and the response 306 exist in the caching database 208, and the response 306 is not outdated and/or invalid, a pre-generated response linked with the prompt 302 is retrieved from the caching database 208. Such a retrieval process bypasses the need for further computational processing or interaction with the primary database 206. Subsequently, the retrieved response 306 is delivered back to the computing device 102 as an output or resolution to the prompt 302. Therefore, the proposed cache management system 114 ensures rapid response times and efficiency in handling repetitive prompts by leveraging the stored data within the caching database 208.

In some examples, when the response 306 corresponding to the prompt 302 exist in the caching database 208 is outdated and/or invalid, the cache management system 114 removes the data or initiates swapping of the response 306 with a new response generated for the prompt 302. Subsequently, the cache management system 114 update counters and a time stamp associated with the prompt 302 and the associated new response 306 in the caching database 208. Therefore, the data/content of the caching database 208 may be invalidated when the respective data changes or when the LLM 204 is updated, while supporting cache versioning to manage different iterations of cached responses with updates to the LLM 204.

Alternatively, or additionally, if the prompt 302 and the response 306 for the prompt 302 do not exist in the caching database 208 or if the response 306 stored in the caching database 208 is outdated or invalid, the cache management system 114 determines the cache miss 310 and initiates a fallback strategy to generate the response 306 for the prompt 302.

In accordance with the fallback strategy, the cache management system 114 transforms the prompt 302 into input vector embeddings 312. The input vector embeddings 312 capture semantic meaning and context of the prompt. For example, the cache management system 114 may use embedding techniques such as a Word to Vector (Word2Vec), a Global Vectors for Word Representation (Glove), or the like, for transforming the prompt 302 into the input vector embeddings. Upon transformation, the cache management system 114 queries the primary database 206 including the vector store 206*b* (not shown in FIG. 3) and receives precomputed vectors embeddings or vector embeddings 314 that matches the input vector embeddings 312. The vector embeddings 314 may be received from the primary database 206 based on similarity scores computed between the vector embeddings 314 and the input vector embeddings 312 using, for example, cosine similarity method. For example, the cache management system 114 may query the primary database 206 and retrieve top ‘k’ vector embeddings matching the input vector embeddings 312. Here, ““k” represents a number of top matches retrieved, which is determined based on requirements or predefined settings.

The cache management system 114 inputs the prompt 302, and the vector embeddings 314 to the LLM 204 for generating the response 306. The cache management system 114 provides the response 306 to the computing device 102 in response to the received prompt 302.

In accordance with implementations of the present disclosure, the cache management system 114 manages storage of the prompt 302 and the associated response 306 (e.g., the data (302, 306)) in the caching database 208 based on the multiple caching metrics and/or the metadata/schema. Examples of the caching metrics may include total requests, total cache hits, total cache misses, total evictions, total response times, a cache hit ratio, a cache miss ratio, a cache eviction ratio, an average response time, a cache size, TTL settings, and/or the like. Examples of the metadata may include a last data modified date, reusability score, a usage count, a size of the received prompt, a size of the response, a response time to generate the response, end-user ratings, a percentage of time the response is correctly generated, a validity period, a trend associated with the received prompt, a tag indicating tolerance level/required latency, and/or a cost associated with generating the response 306. Managing the storing of the data (302, 306) in the caching database 208 based on the multiple caching metrics and the metadata/schema is described in detail in conjunction with FIG. 2, therefore not repeated herein for sake of brevity.

For example, in accordance with the multiple caching metrics and the metadata, the cache management system 114 may identify and store the data that is easy to update, or the data with relaxed consistency, or the data including computationally intensive response, or the data with shorter and less complex response, the data that is popular, the data that is trending, the data that is common, the data including recommendation, the data with less variability (e.g., stable data), the data with bandwidth constraint, or the like, in the caching database 208.

For another example, consider a scenario wherein the cache management system 114, using the multiple caching metrics and the metadata, determines that size and variability of the data (302, 306) is very large. In such a scenario, the cache management system 114 stores a part of the data (302, 306) (e.g., a partial data) in the caching database 208 or does not store the data (302, 306) in the caching database 208.

For yet another example, consider a scenario wherein the cache management system 114, using the tag of the metadata, determines that the data (302, 306) is zero-tolerance data associated with very low latency. In such a scenario, the cache management system 114 stores the data in the caching database 208 due to graceful degradation.

Figure 4:
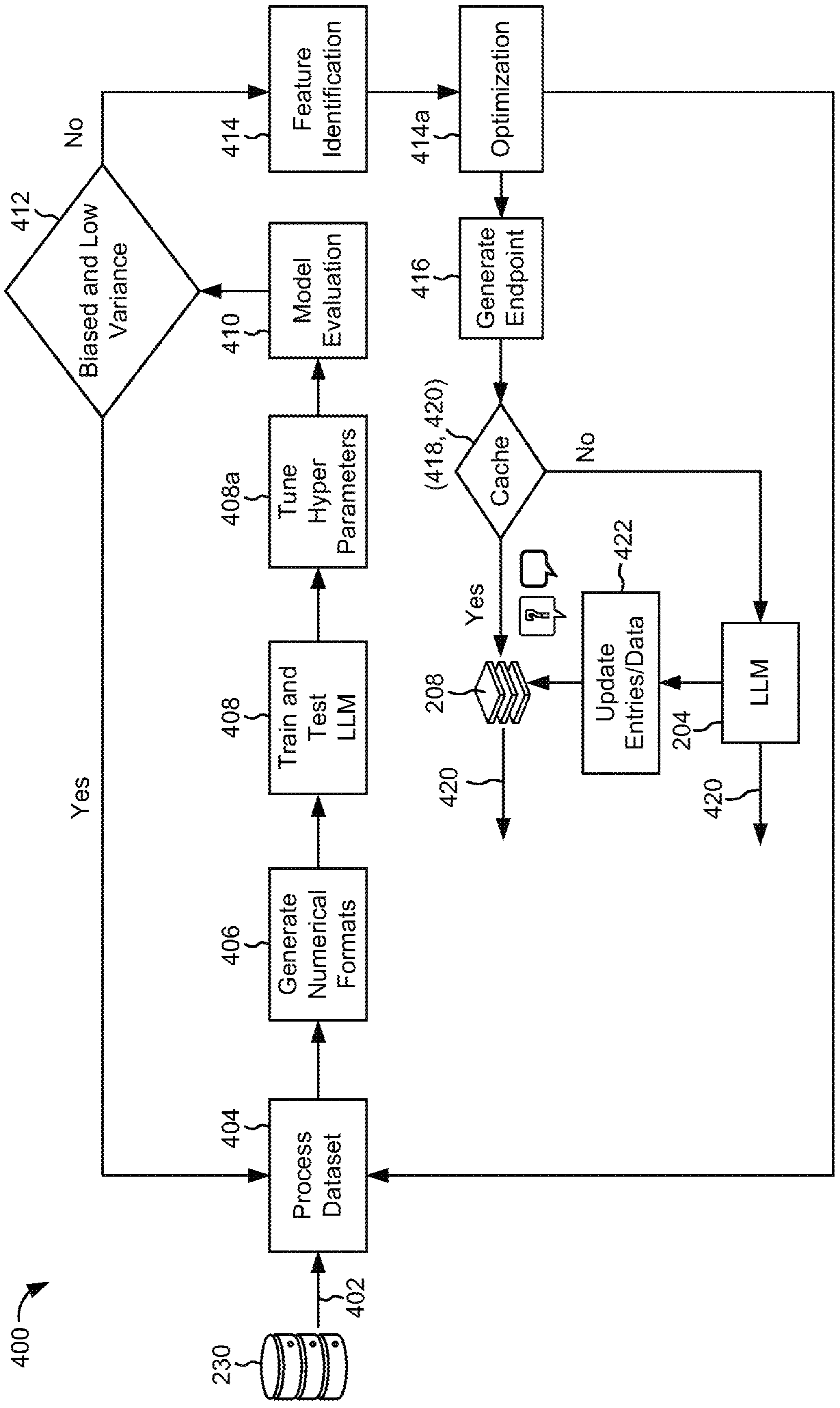
FIG. 4 illustrates an example heuristic method/approach employed for adaptive caching of responses generated an LLM, in accordance with implementations described in this disclosure.

FIG. 4 illustrates an example heuristic method/approach 400 employed for adaptive caching of responses generated by the LLM 204, in accordance with implementations of the present disclosure. FIG. 4 is explained in conjunction with FIGS. 1-3.

The cache management system 114 receives dataset 402 from the database 230 for training of the LLM 204. The dataset 402 may be collected from different data sources and may include multiple prompts and associated responses. Upon receiving the dataset 402, the cache management system 114 (not shown in FIG. 4) processes the dataset 402 to create processed dataset 404. In some examples, the cache management system 114 may create the processed dataset 404 by expanding the dataset 402 using data augmentation techniques, tokenizing the dataset 402 to break down text of the dataset 402 into manageable units, and normalizing the dataset 402 by converting all the text of the dataset 402 into lowercase (or uppercase), and removing punctuation, noise, and stop words. Additionally, the cache management system 114 may create the processed dataset 404 by applying stemming or lemmatization techniques on the dataset 402 to standardize word forms, followed by vectorization to convert textual and categorical data into numerical representations.

The cache management system 114 performs categorical encoding of the processed dataset 404 to transform categorical variables (e.g., labels or classes) of the processed dataset 404 into numerical representations/formats 406. In some examples, the cache management system 114 may use encoding techniques such as one-hot encoding or label encoding to transform the categorical variables into the numerical representations/formats 406.

The cache management system 114 inputs the numerical representations/formats 406 to the LLM 204 for training of the LLM 204 to generate test dataset 408. The test dataset 408 may correspond to the dataset 402. In some examples, training of the LLM 204 may include tuning of hyperparameters 408*a* (for example, learning rate, hidden layer size, activation function, and the like) of the LLM 204 to optimize model parameters, and, thereby, enhancing the ability of the LLM 204 to generalize to unseen data.

Further, the cache management system 114 evaluates the test dataset 408 with respect to the dataset 402 and generates various evaluation parameters 410. Examples of the evaluation parameters 410 may include Area Under Curve (AUC) curves, SHapley Additive explanations (SHAP), Local Interpretable Model-agnostic Explanations (LIME), statistical parameters and/or the like. Examples of the statistical parameters may include F1 score, Gini coefficient, entropy, information gain (IG), gain ratio, and chi-square values. From the evaluation parameters 410, the cache management system 114 may assess the predictive accuracy and robustness of the trained LLM 204.

In some examples, the cache management system 114, using the evaluation parameters 410, determines if the trained LLM 204 exhibits biased data (e.g., the generated test dataset 408 includes biased data) and low variance metrics 412. If the trained LLM 204 exhibits the biased data and low variance metrics 412, the cache management system 114 initiates retraining of the LLM 204 by removing the biased data in the dataset 402 or initiates retraining of the LLM 204 frequently using more number of datasets.

If the trained LLM 204 does not exhibit the biased data and the low variance metrics 412, the cache management system 114 identifies importance of features 414 in the training dataset. The cache management system 114 uses the identified features 414 to optimize efficiency and performance 414*a* of the LLM 204. In some examples, optimizing the efficiency and performance of the LLM 204 may include tuning the hyperparameters 408*a* of the LLM 204.

Once the LLM 204 is trained and optimized, the cache management system 114 generates an endpoint 416 for adaptive caching of the responses generated by the LLM 204. The end point may be used for managing storing or removing of the data including the responses and the associated prompts from the caching database 208. The endpoint 416 may include the multiple caching metrics and the metadata. Examples of the caching metrics and the metadata are provided in table 1, given below:

TABLE 1

Example Caching Metrics/Metadata and associated description

| Caching metrics/Metadata | Description |
|---|---|
| Last modified date | A date when a prompt/response is last updated, which helps in determine if data may be outdated or not. |
| Category/Tags | Tags may be used to organize and group similar topics for easier navigation and retrieval. |
| Type | A method of organizing information, such as hierarchical, flat, or networked, defining how topics or categories are structured and related. |
| Reusability score | A reusability score measures how adaptable a prompt is; whether a prompt is highly specific to a particular context or more general and versatile for various applications. |
| Usage count | A number of times a template has been utilized. |
| Rating/Feedback | Ratings and reviews provided by the users, reflecting their satisfaction and experiences with a template. |
| Length/Size | A character or word count of a prompt indicates overall length of the prompt. |
| Success rate | A percentage of instances where a prompt generated a correct or desired response. |
| Intent | A primary objective or purpose of a prompt that outlines what it is designed to achieve. |
| Validity period | A duration for which a prompt remains accurate and relevant, subject to change based on updates or new data. |
| Popularity count | A frequency with which a prompt has been accessed or used, which may be tracked and stored in a column of the caching database to measure its popularity. |
| Trend | A rate of change in usage of a prompt over a specified period, used to analyze its increasing or decreasing popularity. |
| Multiple task | An ability to perform more than one function, such as summarization and sentiment analysis. |
| Response time | An average time taken to generate a response. |
| Historical modifications | Records of changes made to a prompt over time; frequent modifications may indicate that the prompt is not suitable for storing in the caching database. |
| Usage frequency | A rate at which a prompt is used, measured over a tumbling or sliding window, to identify and prioritize commonly used prompts. |
| Associated cost | An expense incurred to generate a response from a prompt. |
| Multi-media | Multi-media includes various formats such as speech and text; may be too large for storing in the caching database entirely due to diverse content types. |
| Predicted effectiveness | An estimate of how well a prompt is expected to perform, used for ranking and prioritizing prompts based on their anticipated utility. |
| Task type | A specific function a prompt performs, such as summarization, Q&A, and/or sentiment analysis. |

TABLE 1-continued

Example Caching Metrics/Metadata and associated description

| Caching metrics/Metadata | Description |
|---|---|
| Stable portions of response | Sections of a response that remain consistent, such as a standard disclaimer, which are ideal for partial caching due to their infrequent changes. |

During inference/production stage, when the cache management system 114 receives a prompt 418 intended for the LLM 204 from the computing device 102, the cache management system 114 checks if the prompt 418 and an associated response 420 are already stored in the caching database 208. If the prompt 418 and the associated response 420 are already stored in the caching database 208, the cache management system 114 retrieves the response 420 from the caching database 208 and provides the retrieved response 420 to the computing device 102 for the received prompt 418. Therefore, calling of the LLM 204 multiple times for the same/obvious responses is reduced, which further prevents generation of the responses from the scratch. Due to which, time and resources may be saved while improving response time of the system 200 (shown in FIG. 2). In addition, efficiency of the LLM 204 may be improved during high volume of requests/prompts.

If the prompt 418 and the associated response 420 are not stored in the caching database 208, the cache management system 114 enables the LLM 204 through the fallback strategy (described along with FIG. 3) to generate the response 420 for the prompt 418. Once the response 420 is generated by the LLM 204, the cache management system 114 manages storing of the prompt 418 and the associated response 420 as the data in the caching database 208 based on the endpoint, which is described in detail along with FIG. 2. Therefore, repeated description is omitted herein for sake of brevity. Therefore, the responses for the frequently requested prompts may be stored in the caching database 208, and, thereby, latency and overall system responsiveness may be improved.

In some examples, when the prompt 418 and the associated response 420 are not stored in the caching database 208, the cache management system 114 may use eviction policies and TTL setting to update 422 entries/data stored in the caching database 208 effectively. Such an update process may ensure that the caching database 208 always remains updated with the latest responses, while maintaining consistency and optimizing future response times.

Figure 5:
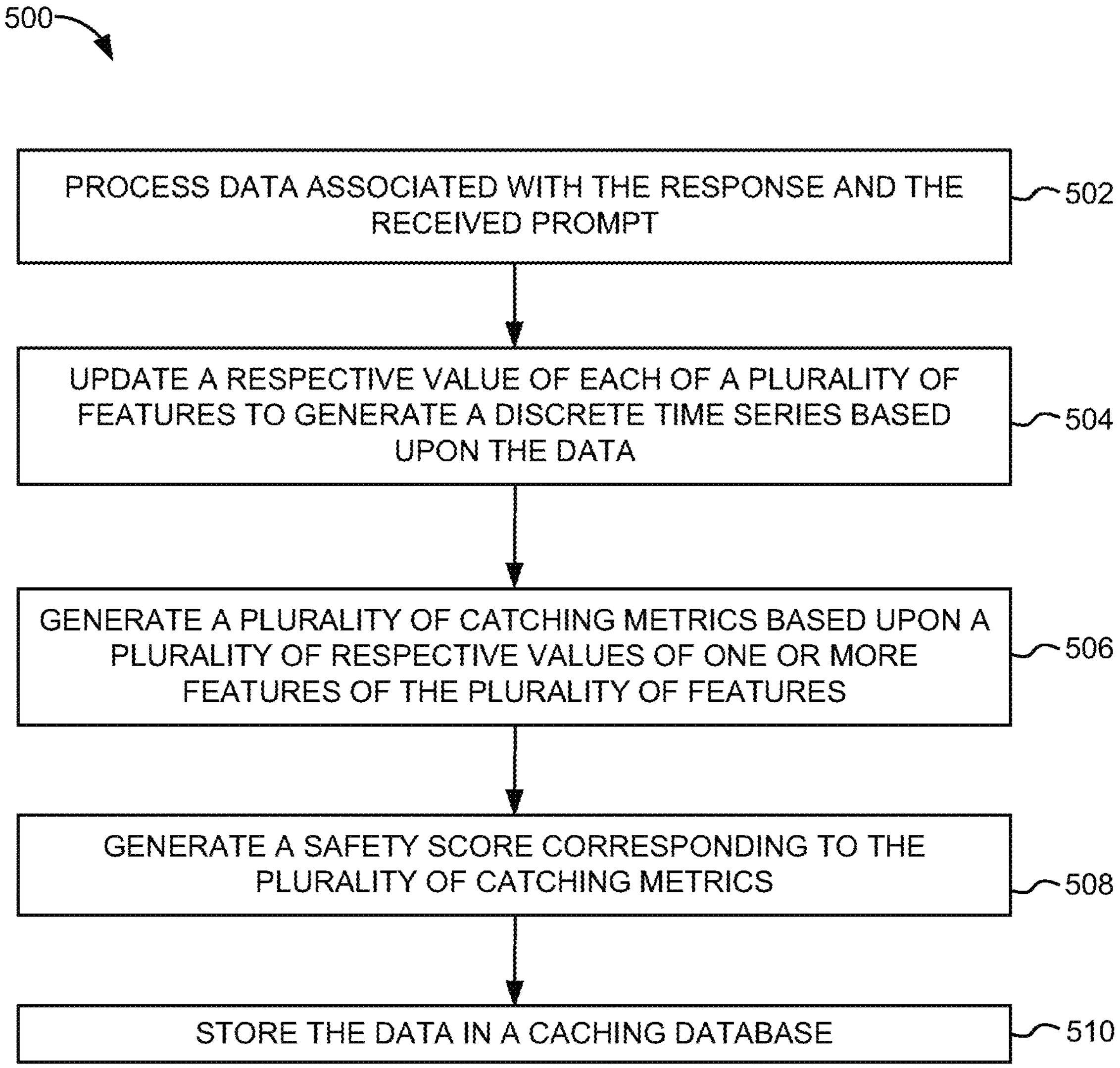
FIG. 5 is a flow diagram that presents an example method for adaptive caching of the responses generated by LLMs, in accordance with implementations of the present disclosure.

FIG. 5 is a flow diagram that presents an example method 500 for adaptive caching of responses generated by the LLM 204 (shown in FIG. 2), in accordance with implementations of the present disclosure. In some implementations, the method 500 may be executed within the cache management system 114 and by one or more processors 212 (shown in FIG. 2) using modules of the memory 214 (shown in FIG. 2). FIG. 5 is explained in conjunction with FIGS. 1-4.

The method 500 includes processing 502 data. The data may be associated with a generated response and a received prompt. For example, the response is generated by the LLM 204 when the prompt is received. The prompt may include, but is not limited to, a query, an informational prompt, an instructional prompt, an analytical prompt, an advisory prompt, and/or a role-based prompt. The prompt may indicate one or more tasks to be performed by the LLM 204.

In some implementations, the data may be processed 502 by analyzing the data to identify one or more of outliers, short-term fluctuations, a level, a trend, an anomaly, and/or a seasonality of the received prompt and/or the response, which are described in detail in conjunction with FIG. 2. Therefore, repeated description is omitted herein for sake of brevity.

The method 500 includes updating 504 a respective value of each of a plurality of features to generate a discrete time series based upon the processed 502 data. The discrete time series reflects a state of a caching database 208. The discrete time series shows trends in logged data. By way of an example, the plurality of features may include one or more of a total number of requests made to the caching database 208, a total number of times requested data is found in the caching database 208, a total number of times requested data is not found in the caching database 208, a total number of times data associated with the response and the received prompt is removed from the caching database 208, a total response time for received requests, a total number of times a particular key associated with the received prompt is accessed, a size of the response associated with the particular key, and/or a time duration elapsed since the particular key is last accessed.

The method 500 further includes generating 506 a plurality of caching metrics. The plurality of caching metrics may be generated based upon a plurality of respective values of one or more features of the plurality of features. The caching metrics provide insights into the efficiency and effectiveness of the caching database 208. For example, the plurality of caching metrics may include a cache hit rate, which measures the percentage of requests successfully served from the caching database 208, and a cache miss rate, indicating how often requested data is not found in the caching database 208. Other caching metrics may include response time measurements. The response time measurements include comparing the time taken to retrieve data from the caching database 208 versus generating or providing a response using the LLM 204

The method 500 further includes generating 508 a safety score corresponding to the plurality of caching metrics. The safety score may be generated based upon analysis of various metrics, including hit rates, miss rates, response times, and any anomalies detected in the data. The safety score may be calculated to assess the overall reliability and effectiveness of the caching database 208. The safety score reflects performance of the caching database 208 in terms of reliability and consistency. Generation of the safety score is described in detail in conjunction with FIG. 2, therefore not described herein for sake of brevity.

The method 500 further includes storing 510 the data in the caching database 208. The data may be stored based, at least in part, upon the safety score, a response time predicted for a request associated with the received prompt, and metadata associated with the data. This step may be performed by the data handler 228. It should be noted that the caching database 208 may be a distributed synchronized caching database. The data may be stored in the caching database 208 along with the metadata. The metadata includes one or more of a last modified date, a reusability score, a usage count, a size of the received prompt, a size of the response, a response time to generate the response, end-user ratings, a percentage of time the response is correctly generated, a validity period, a trend associated with the received prompt, and/or a cost associated with generating the response.

In some examples, the data may be stored in the caching database 208 based on volatility/variability of the response or the size of the data. If the volatility or variability of the response is greater than the predetermined variability threshold, a partial or no data may be stored in the caching database 208. Similarly, if the size of the response of the data is greater than the size threshold, or the response of the data includes the frequently updated data, a partial or no data may be stored in the caching database 208.

Further, in some implementations, the data may be removed from the caching database 208. The data may be removed based, at least in part, upon a last access time of the data, a number of access counts associated with a key corresponding to the data, a size of data of the response, an order of an entry of the data into the caching database 208, and a creation time of the entry of the data into the caching database 208. For example, the data may be removed if it has not been accessed for an extended period, if its access count is low, or if its size is deemed excessive compared to predefined thresholds. Additionally, data that is more frequently updated or exhibits high volatility may be eligible for removal to avoid storing outdated or less relevant information. By applying these removal criteria, the cache management system 114 helps caching database 208 to maintain efficiency and relevance, ensuring that only the most pertinent data remains accessible.

Implementations of the present disclosure provide technical solutions to multiple technical problems that arise in the context of generating responses using LLMs. Implementations of the present disclosure provide an adaptive heuristic approach for managing storage or removal of data from a caching database maintained for an LLM. The data includes responses generated by the LLM and prompts received for generation of the responses within the caching database. Such an adaptive heuristic approach optimizes response time and performance of the caching database, while reducing power consumption and time required to generate the responses. The optimized caching database may handle high load situations, contributing robustness of the system 200. With the proposed adaptive heuristic approach, bandwidth constraints are mitigated by reducing a need to fetch the data repeatedly from the primary database, which is particularly beneficial for LLMs operating in data-intensive environments. Further, the proposed adaptive heuristic approach supports relaxed consistency, allowing for easy updates and adaptation to variability in responses, ensuring flexibility without compromising reliability of the caching database 208. This means that generation of the responses may not require strict consistency between the caching database and the primary database. Instead, the proposed adaptive heuristic approach may tolerate some level of inconsistency, which facilitates easier and more efficient updates to the data within the caching database.

Implementations of the present disclosure further ensure graceful degradation during updating of the data of the caching database. This means that even when the data within the caching database is being updated or modified, availability and responsiveness of the data is maintained. The graceful degradation ensures that users/computing devices continue to receive timely responses and the caching database remains functional, rather than experiencing complete failure or significant downtime. This graceful degradation helps maintain a positive user experience and ensures that the caching database remains operational even during periods of cache maintenance or updates in the cashing database.

Implementations of the present disclosure further enable adaptive caching of the response generated by the LLM based on evaluation of comprehensive caching metrics such as last modified date, usage count, success rate, TTL settings, and/or the like. Thereby, enabling effective optimization of resource utilization. The TTL settings further enhance efficiency of the caching database by dynamically adjusting caching durations based on performance metrics. Therefore, implementations of the present disclosure involve robust metrics tracking and eviction logic contributing to continuous optimization, and to making cache management more dynamic and efficient over time.

Implementations of the present disclosure further:

Enhance processing speed: adaptive caching of the responses generated by the LLM may enhance processing speed of the responses, which further reduces computational load and accelerating performance of the caching database.

Minimize bandwidth requirements: The bandwidth requirements may be minimized by storing the frequently accessed data locally, which further results in efficient data retrieval without extensive network usage.

Enable effective utilization of resources: the proposed heuristic approach for adaptive caching of the responses generated by the LLM based on the caching metrics optimizes resource utilization, while effectively reducing storage needs and enhancing overall efficiency.

Ensure compliance with RAI principles: the proposed heuristic approach for adaptive caching of the responses generated by the LLM aligns with RAI principles, while ensuring ethical and responsible use of LLM by implementing robust caching practices. Therefore, scalability, reliability, and efficiency of caching databases in Gen AI applications may be enhanced, supporting advanced Gen AI functionalities while adhering to responsible and sustainable computing practices.

Reduce server load: The proposed heuristic approach involves storing frequently requested data. Storing the frequently accessed data decreases the number of direct requests made to the LLM, which in turn lowers the server's load. As a result, the caching database may scale effectively based on usage demands.

Accelerate data retrieval: The cached data is held in memory, which enables faster access times. As a result, response speed is enhanced. The caching database may handle a higher volume of requests per unit of time.

Decrease network traffic: The proposed heuristic approach caches frequently requested data and optimizes storage based on various metrics. As a result, the amount of data that must travel across the network may be reduced and network congestion may be decreased.

Improve user experience: Effective caching results in faster loading times and the faster loading times improve user experience. Therefore, the proposed heuristic approach contributes to a significantly enhanced overall user experience.

Provide offline support: Caching enables users/computing devices to access previously loaded data (e.g., the data stored in the caching database), which ensures high availability and continuity of service. Therefore, the computing devices may maintain access even without an active internet connection.

Figure 6:
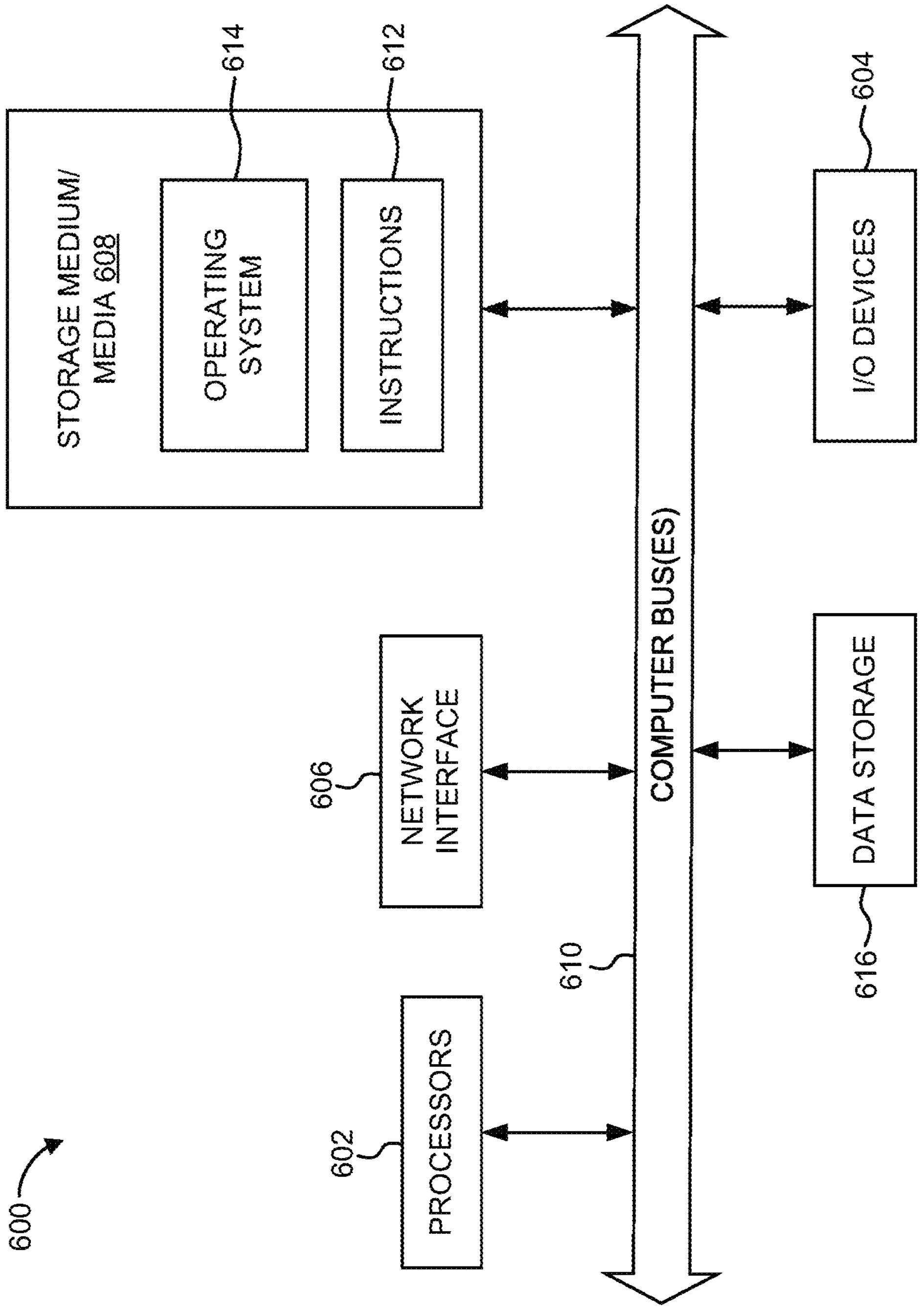
FIG. 6 illustrates a computer system that may be used to implement a cache management system.

FIG. 6 illustrates a computer system 600 that may be used to implement the cache management system 114. More particularly, computing machines such as desktops, laptops, smartphones, tablets, and/or wearable electronic devices which may be used for adaptive caching of responses generated by the LLM 204 and may have the structure of the computer system 600. The computer system 600 may include additional components not shown and that some of the process components described may be removed and/or modified. In another example, a computer system 600 may be deployed on external-cloud platforms such as cloud, internal corporate cloud computing clusters, organizational computing resources, and/or the like.

The computer system 600 includes processor(s) 602, such as a central processing unit, a controller, an application specific integrated circuit (ASIC), or another type of processing circuit, input/output devices (I/O) 604, such as a display, a mouse, a keyboard, etc., a network interface 606, such as a Local Area Network (LAN) interface, a wireless 802.11x interface, a 3G, 4G, 5G, or 6G mobile WAN or a WiMax WAN, and a computer-readable medium 608. Each of these components may be operatively coupled each other via one or more computer bus(es) 610. The computer-readable medium 608 may be any suitable medium that participates in providing instructions to the processor(s) 602 for execution. For example, the computer-readable medium 608 may be non-transitory or non-volatile medium, such as a magnetic disk or solid-state non-volatile memory or volatile medium such as RAM. The instructions or modules stored on the computer-readable medium 608 may include machine-readable or machine-executable instructions or code 612 executed by the processor(s) 602 that cause the processor(s) 602 to perform the methods and functions of the cache management system 114.

The cache management system 114 may be implemented as software stored on a non-transitory computer-readable medium and executed by the processors 602. For example, the computer-readable medium 608 may store an operating system 614, such as MAC OS, MS WINDOWS, UNIX, or LINUX, and code 612 for the cache management system 114. The operating system 614 may be multi-user, multiprocessing, multitasking, multithreading, real-time, and the like. For example, during runtime, the operating system 614 and the code for the cache management system 114 are executed by the processor(s) 602.

The computer system 600 may include a data storage 616, which may include non-volatile data storage. The data storage 616 stores any data used or generated by the cache management system 114.

The network interface 606 connects the computer system 600 to external systems for example, via a LAN. Also, the network interface 606 may connect the computer system 600 to the Internet. For example, the computer system 600 may connect to web browsers and other external applications and systems via the network interface 606.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (e.g., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for adaptive caching of a response generated by a Large Language Model (LLM) for a received prompt, comprising:

processing, by one or more processors, data associated with the response and the received prompt;

updating, by the one or more processors, a respective value of each of a plurality of features to generate a discrete time series based upon the data;

generating, by the one or more processors, a plurality of caching metrics based upon a plurality of respective values of one or more features of the plurality of features;

generating, by the one or more processors, a safety score corresponding to the plurality of caching metrics, wherein the safety score is inversely proportional to a metric score generated for the plurality of caching metrics, wherein the metric score is calculated by:

aggregating value of the plurality of caching metrics to obtain an aggregated metric score;

applying a linear regression sigmoid function on the aggregated metric score to normalize the aggregated metric score, wherein the normalization transforms the aggregated metric score between 0 and 1; and storing, by the one or more processors, the data in a caching database, wherein storing the data in the caching database comprises storing a partial or no data in the caching database upon determining a size of the response of the data being greater than a threshold value, and the data is based, at least in part, upon the safety score, a response time predicted for a request associated with the received prompt, and metadata associated with the data.

2. The computer-implemented method of claim 1, wherein the plurality of features includes one or more of: a total number of requests made to the caching database; a total number of times requested data is found in the caching database; a total number of times requested data is not found in the caching database; a total number of times data associated with the response and the received prompt is removed from the caching database; a total response time for received requests; a total number of times a particular key associated with the received prompt is accessed; a size of the response associated with the particular key; and/or a time duration elapsed since the particular key is last accessed.

3. The computer-implemented method of claim 1, wherein the processing comprises analyzing the data for identifying one or more of: outliers, short-term fluctuations, a level, a trend, an anomaly, and/or a seasonality of the received prompt and/or the response.

4. The computer-implemented method of claim 1, wherein the caching database is a distributed synchronized caching database.

5. The computer-implemented method of claim 1, wherein the data is stored in the caching database along with the metadata, the metadata including one or more of: a last modified date, a reusability score, a usage count, a size of the received prompt, a size of the response, a response time to generate the response, end-user ratings, a percentage of time the response is correctly generated, a validity period, a trend associated with the received prompt, and/or a cost associated with generating the response.

6. The computer-implemented method of claim 1, further comprising removing, by the one or more processors, the data from the caching database based, at least in part, upon a last access time of the data, a number of access counts associated with a key corresponding to the data, a size of data of the response, an order of an entry of the data into the caching database, and a creation time of the entry of the data into the caching database.

7. The computer-implemented method of claim 1, wherein storing the data in the caching database comprises storing a partial or no data in the caching database upon determining a volatility or variability of the response being greater than a predetermined threshold value.

8. The computer-implemented method of claim 1, wherein storing the data in the caching database comprises storing a partial or no data in the caching database upon determining that the response includes frequently updated data.

9. A system for adaptive caching of a response generated by a Large Language Model (LLM) for a received prompt, the system comprising:

at least one memory storing machine-executable instructions; and at least one processor communicatively coupled with the at least one memory, wherein the at least one processor executes the machine-executable instructions to perform operations comprising:

processing data associated with the response and the received prompt;

updating a respective value of each of a plurality of features to generate a discrete time series based upon the data;

generating a plurality of caching metrics based upon a plurality of respective values of one or more features of the plurality of features;

generating a safety score corresponding to the plurality of caching metrics, wherein the safety score is inversely proportional to a metric score generated for the plurality of caching metrics, wherein the metric score is calculated by:

aggregating value of the plurality of caching metrics to obtain an aggregated metric score;

applying a linear regression sigmoid function on the aggregated metric score to normalize the aggregated metric score, wherein the normalization transforms the aggregated metric score between 0 and 1; and storing the data in a caching database, wherein storing the data in the caching database comprises storing a partial or no data in the caching database upon determining a size of the response of the data being greater than a threshold value, and the data is based at least in part upon the safety score, a response time predicted for a request associated with the received prompt, and metadata associated with the data.

10. The system of claim 9, wherein the plurality of features includes one or more of: a total number of requests made to the caching database; a total number of times requested data is found in the caching database; a total number of times requested data is not found in the caching database; a total number of times data associated with the response and the received prompt is removed from the caching database; a total response time for received requests; a total number of times a particular key associated with the received prompt is accessed; a size of the response associated with the particular key; and/or a time duration elapsed since the particular key is last accessed.

11. The system of claim 9, wherein the processing comprises analyzing the data for identifying one or more of:

outliers, short-term fluctuations, a level, a trend, an anomaly, and/or a seasonality of the received prompt and/or response.

12. The system of claim 9, wherein the caching database is a distributed synchronized caching database.

13. The system of claim 9, wherein the data is stored in the caching database along with the metadata, the metadata including one or more of: a last modified date, a reusability score, a usage count, a size of the received prompt, a size of the response, a response time to generate the response, end-user ratings, a percentage of time the response is correctly generated, a validity period, a trend associated with the received prompt, and/or a cost associated with generating the response.

14. The system of claim 9, wherein the operations further comprise removing the data from the caching database based at least in part upon a last access time of the data, a number of access counts associated with a key corresponding to the data, a size of data of the response, an order of an entry of the data into the caching database, and a creation time of the entry of the data into the caching database.

15. The system of claim 9, wherein storing the data in the caching database comprises storing a partial or no data in the caching database upon determining a volatility or variability of the response being greater than a predetermined threshold value.

16. The system of claim 9, wherein storing the data in the caching database comprises storing a partial or no data in the caching database upon determining that the response includes a frequently updated data.

17. A non-transitory computer-readable media comprising instructions stored thereon for adaptive caching of a response generated by a Large Language Model (LLM) for a received prompt, wherein the instructions, when executed by at least one processor of a computing system, cause the computing system to perform operations comprising:

processing data associated with the response and the received prompt;

updating a respective value of each of a plurality of features to generate a discrete time series based upon the data;

generating a plurality of caching metrics based upon a plurality of respective values of one or more features of the plurality of features;

generating a safety score corresponding to the plurality of caching metrics, wherein the safety score is inversely proportional to a metric score generated for the plurality of caching metrics, wherein the metric score is calculated by:

aggregating value of the plurality of caching metrics to obtain an aggregated metric score;

applying a linear regression sigmoid function on the aggregated metric score to normalize the aggregated metric score, wherein the normalization transforms the aggregated metric score between 0 and 1; and storing the data in a caching database, wherein storing the data in the caching database comprises storing a partial or no data in the caching database upon determining a size of the response of the data being greater than a threshold value, and the data is based at least in part upon the safety score, a response time predicted for a request associated with the received prompt, and metadata associated with the data.

18. The non-transitory computer-readable media of claim 17, wherein the plurality of features includes one or more of: a total number of requests made to the caching database; a total number of times requested data is found in the caching database; a total number of times requested data is not found in the caching database; a total number of times data associated with the response and the received prompt is removed from the caching database; a total response time for received requests; a total number of times a particular key associated with the received prompt is accessed; a size of the response associated with the particular key; and/or a time duration elapsed since the particular key is last accessed.

19. The non-transitory computer-readable media of claim 17, wherein the processing the data comprises analyzing the data for identifying one or more of: outliers, short-term fluctuations, a level, a trend, an anomaly, and/or a seasonality of the received prompt and/or response.

20. The non-transitory computer-readable media of claim 17, wherein the caching database is a distributed synchronized caching database, and wherein the data is stored in the caching database along with the metadata, the metadata including one or more of: a last modified date, a reusability score, a usage count, a size of the received prompt, a size of the response, a response time to generate the response, end-user ratings, a percentage of time the response is correctly generated, a validity period, a trend associated with the received prompt, and/or a cost associated with generating the response.

* * * * *